Feb. 17, 1970

HOZUMI TANAKA ETAL 3,495,951

SCREW REACTOR

Filed Dec. 30, 1966

INVENTORS
H. TANAKA
T. HONJYO
M. HANABUSA
K. GOSHIMA
Y. UNNO
S. KAJIWARA
H. KOIZUMI

BY *Wenderoth, Lind and Ponack*

ATTORNEYS

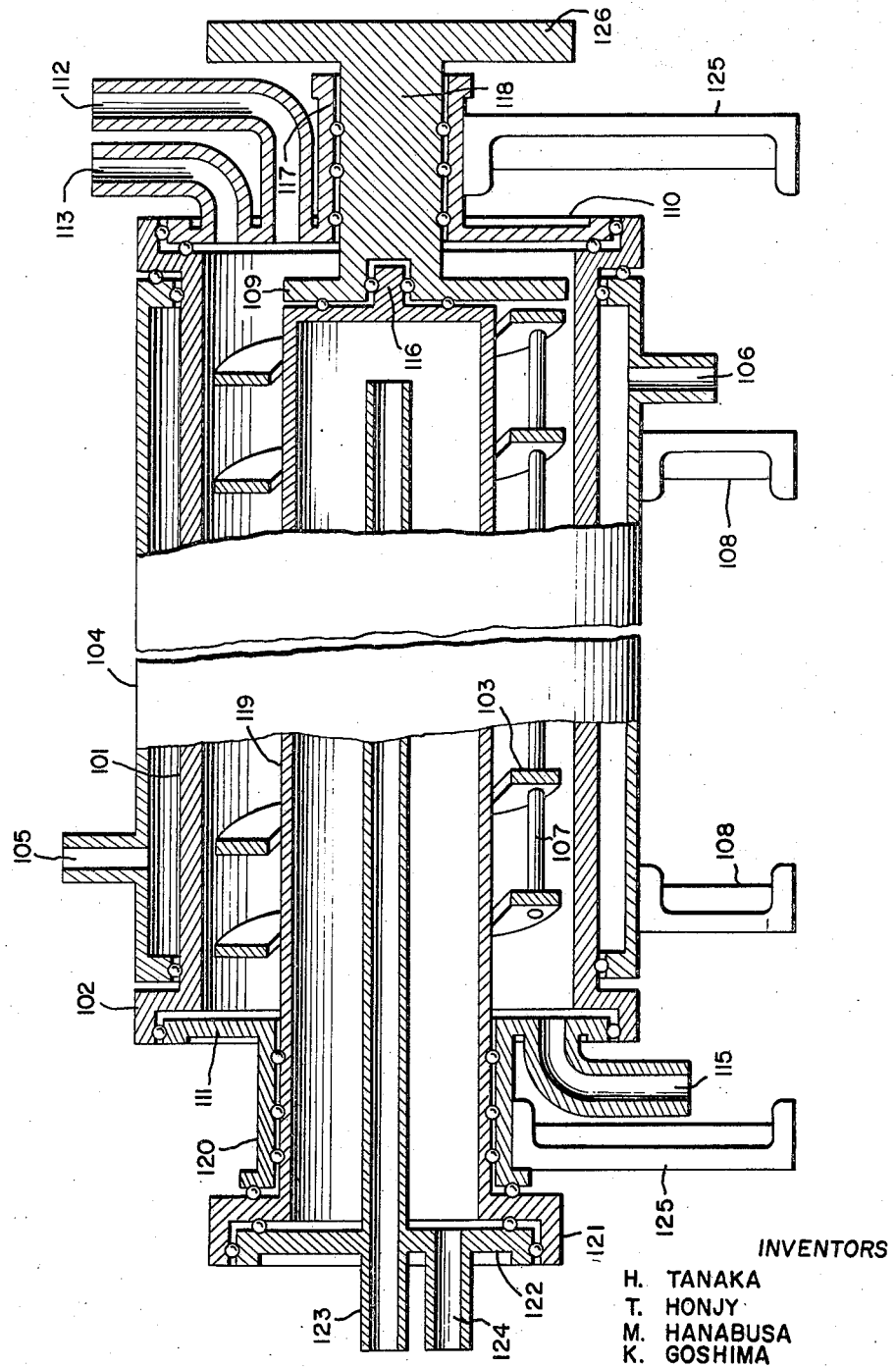

United States Patent Office 3,495,951
Patented Feb. 17, 1970

3,495,951
SCREW REACTOR
Hozumi Tanaka, Ashiya-shi, Tahiko Honjyo, Minoo-shi, Minoru Hanabusa, Takarazuka-shi, Kazuaki Goshima, Hiraoka-shi, and Yutaka Unno and Sadaji Kajiwara, Osaka-shi, and Hiroaki Koizumi, Toyonaka-shi, Japan, assignors to Shionogi & Co., Ltd., Fukushima-ku, Osaka, Japan
Continuation-in-part of application Ser. No. 567,585, July 25, 1966. This application Dec. 30, 1966, Ser. No. 613,378
Claims priority, application Japan, Aug. 27, 1966, 41/56,572
Int. Cl. B01j 1/00; F28d 11/08
U.S. Cl. 23—285       12 Claims

ABSTRACT OF THE DISCLOSURE

A heat exchange screw reactor with a drum member having at least one inlet opening therein and at least one outlet opening for discharging material therefrom. A jacket for a heat exchange medium is mounted around said drum member and substantially surrounding the outside of the peripheral wall thereof. An inner pipe member is mounted within said drum member and substantially coaxial therewith, said inner pipe member having means therein for circulation of a heat exchange medium therethrough. Said drum member and said inner pipe member define between them an annular cylindrical fluid-tight space. A screw member is positioned inside said annular cylindrical fluid-tight space, the outer edge of said screw member being adjacent to the inside of the wall of said drum and the inside edge of the screw member being adjacent to the outside surface of said inner pipe. Said drum, inner pipe and screw members are rotatable relative to each other, and means are coupled to at least one of said members for rotating said member.

---

This application is a continuation-in-part of application Ser. No. 567,585, filed July 25, 1966, now abandoned.

The present invention relates to a reactor for carrying out a chemical process, and more particularly to a heat exchange screw type reactor which is built so as to perform a uniform progressive heat exchange reaction on a traveling fluid reactant and which is capable of imparting so-called "plug flow" to the reactant and a uniform and efficient heat exchange between the reactant and a heat exchange medium.

The primary object of the present invention is to provide an apparatus for performing a progressive reaction on a fluid reactant which is continuously flowing through a tubular reactor. Another object of the present invention is to provide an apparatus for imparting a plug flow, in other words a piston-like flow, which is deemed to be essential for ideal reactions in a process for preparing fine chemicals, to a reactant which is traveling through said tubular reactor. Still another object of the present invention is to provide an apparatus which can perform an effective heat exchange between said reactant and a heat exchange medium. A further object of the present invention is to provide a suitable reaction apparatus which is capable of performing a reaction as aforementioned on said reactant.

The present invention is a heat exchange screw reactor comprising: a container having a shape of an elongated drum, said container having a plurality of inlet openings therein for charging material thereto and at least one outlet opening for discharging material therefrom; a jacket for a heat exchange medium mounted on said drum; an inner pipe mounted coaxially within said drum on an end wall of said drum and having means for circulation of said heat exchange medium therethrough; said drum and said inner pipe defining between them an annular cylindrical fluid-tight space; a screw inside said annular cylindrical space and rotatable around said inner pipe, the outer edge of the blade of said screw and the inner edge thereof being adjacent to the inside wall of said drum and the outside surface of said inner pipe respectively, and means coupled to said screw for rotating said screw. The inner pipe and the drum can be mounted so as to be independently rotatable, and in such case appropriate drive means is provided.

The said primary and other objects and attendant advantages of the present invention will be apparent to those who are conversant with the art to which the present invention pertains from the following disclosure and the accompanying drawing as well as the appended claims. In said drawings:

FIGURE 3 is a view similar to FIGURE 1 of a modified form of screw reactor according to the present invention.

When a fluid which travels through a tubular apparatus is subjected to heat exchange with a heat exchange medium through the side wall of the apparatus and the tendency of the fluid is to flow in a streamline flow, the efficiency of the heat exchange is significantly decreased by any factor which diminishes convection, such as a small diameter of the reactor, a comparatively small amount of fluid treated, a low flow rate of the fluid and a small volume change accompanying the reaction, as compared with the case where the fluid has a turbulent flow. In order to accomplish a uniform and efficient heat exchange, particular care must be taken and has been believed to be indispensable. This object has hitherto been accomplished by increasing the flow velocity and therefore increasing the Reynolds number of the fluid or by enlarging the area through which the heat exchange takes place by employing a lengthy flow path in a conventional reactor or heat exchanging equipment.

The aforementioned means are, however, not sufficient and cannot successfully be applied in a small scale treatment, because a larger flow velocity inevitably causes an increase in the flow rate of the fluid traveling through the tube and a longer flow path requires smaller diameter of the flow path accompanied by increase in internal resistance and by striking difference in the flow velocities between the start of the flow path and the end thereof which are extremely detrimental for the desired result.

Figure 2A:
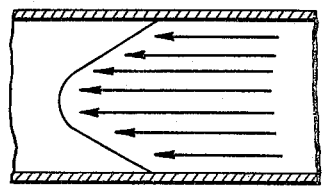
FIGURE 2a is a diagram representing the flow of fluid traveling through a pipe of small diameter in which the flow line of the fluid is in the shape of a paraboloid.

Therefore, a tubular component having a diameter as large as possible and a low flow velocity should be employed for transferring liquid through a small scale heat exchange equipment, such as a heat exchanger or reactor. In such a case, however, the flow through the tube will inevitably become a streamline flow and the shape of the streamline will therefore be a paraboloid, as shown in FIG. 2a, due to the intermolecular action caused by the viscosity of the fluid or by friction losses caused by interface resistance between the tube wall and the fluid. Moreover, the velocity of the fluid will have a maximum value at the center of the flow path and will gradually lessen in the direction from the center to the periphery of the fluid path, and the fluid proximate to the side wall will sometimes become stationary under extreme conditions. Consequently, the heat exchange between the reactant and the heat exchange medium through the pipe wall under such conditions will cause an excess heat exchange for the fluid passing along the wall portion of the apparatus whereas the fluid passing through the center portion will inevitably be discharged without being subject to a sufficient heat exchange, because the difference in periods of time each portion of the fluid spends in the apparatus will become extremely great. A combination of such an excessive heat exchange and a deficient heat exchange is not only undesirable in itself but is also detrimental to the desired result.

Figure 2B:
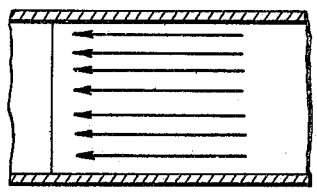
FIGURE 2b is a view similar to FIGURE 2a in which the flow is a plug flow.

In fact, as a consequence of such a detrimental excess heat exchange, good results have never been expected in processing a reactant in a comparatively small amount in an ordinary tubular reactor, and such a reactor has not yet been practically utilized in small scale production in spite of its inherent advantages. In order to achieve the best heat exchange, fluid flow in the form of a plug as shown in FIG. 2b accompanied by a sufficient turbulent flow which causes a convective heat exchange between the fluid near the wall portion and that of center portion has been believed to be the most preferred.

A simple screw reactor has been introduced into this field to overcome the aforementioned various disadvantages. Such an ordinary screw reactor having an axle and a propelling blade thereon is, however, not sufficient to overcome the problems because the axial portion thereof does not have any means for producing a propelling action but rather has a stationary fluid film formed thereon which impedes the movement of the fluid near center portion of the screw reactor.

In addition to this, as a modification of this type of apparatus, a crumb ripening apparatus for artificial silk production has been proposed in the specification of Japanese patent publication Showa 37 No. 11449, in which a couple of agitating blades mounted symmetrically on a main rotating axle and along the plane of said axis, and a pair of screws which are rotated by a sun gear mounted on the end of said main axle through a pair of planetary gears meshing with said sun gear are provided in the interior of the apparatus in order to cause said blades to revolve around said axle and sweep over the full length of the inside wall of said apparatus and to cause said pair of screws to revolve and rotate so as to sweep over the full length of said inside wall and the surface of said main axle. This apparatus is, however, not considered to have sufficient ability to impart the required plug flow to traveling fluid because the stationary fluid film formed on the surface of said main axle cannot be removed by the action of said screws which merely serve to sweep said main axle in the lengthwise direction. Moreover, it is not practical to use such a complicated construction for small scale equipment where simplicity is required.

The disadvantages of the prior apparatus are obviated by the apparatus of the present invention, according to which there is provided a comparatively small scale apparatus which is capable of performing a progressive reaction requiring a uniform and effective heat exchange.

Figure 1:
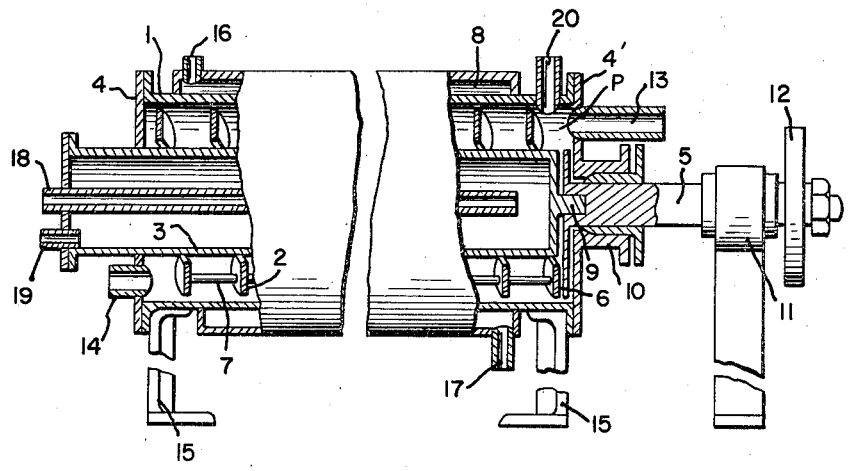
FIGURE 1 is a side elevation view, partially in section, of one embodiment of the screw reactor according to the present invention.
Figure 1A:
FIGURE 1a is an enlarged view of a portion of FIGURE 1.

In the embodiment shown in FIGURE 1, a screw-shaped blade 2 occupies an annular cylindrical space defined between a drum 1, end walls 4 and 4' thereof, and an inner pipe 3 mounted on said end wall 4 and coaxial with said drum 1. Screw-shaped blade 2 is rotatable on inner pipe 3 and is driven by an end disc 6 mounted on power transmitting shaft 5 which can be driven by an outside driving mechanism, and the whole outer edge of the blade is adjacent to the inner surface of said drum and the whole inner edge of the blade is adjacent to the outside surface of said inner pipe 3. The screw-shaped blade 2 is held in shape by bars 7 positioned between the spires of the blade 2 at several points along the circumference thereof. A jacket 8 for heat exchange medium is mounted around said drum 1 and extends along almost the full length of said drum and has an inlet 16 and an outlet 17 therein. One end of said inner pipe 3 has a projection thereon on which is rotatably mounted the power transmitting shaft 5, and the other end has an inlet 18 and an outlet 19 for said heat exchange medium. One of the two end walls, the wall 4', has an inlet opening 13 therein for reactant and has integrally formed therewith a stuffing box 10 which serves to mount the rotating power transmitting shaft 5 in fluid-tight condition in end wall 4'. An outlet 14 for reactant is likewise provided in the other end wall. In this particular example, another inlet 20 for reactant is provided in the outer wall of said drum 1. The power transmitting shaft 5 is rotatably mounted in a bearing 11 and is driven by an outside driving mechanism (not shown) through pulley 12. Furthermore, the whole apparatus is supported on abutments 15.

In the operation of the apparatus of FIGURE 1, one of the reactants, for example a starting material, is continuously supplied through the inlet 13 and the other reactant required for effecting a progressive reaction on the starting material is likewise supplied through the inlet 20. These materials are combined at the confluence P of the two inlets 13 and 20 to initiate the required reaction. The reaction mixture in which the reaction has already been initiated travels towards the left end of the apparatus, as shown in the drawing, by the action of the screw-shaped blade 2 which is rotated in its propelling direction by shaft 5. In this manner, the fluid inside the annular cylindrical space is uniformly moved toward the discharge end thereof in a state closely approximating plug flow, as shown in FIGURE 2b, while also being rotated in the direction of the circumference of the drum. Therefore, the heat exchange through the wall of the drum 1 and/or through the wall of the inner pipe 3 are uniformly and successfully carried out. Besides, heat exchange over the whole cross-sectional area of the flowing material can be achieved in a comparatively short period because the cross-section is in the shape of a ring and a spiral flow takes place which causes a turbulent flow inside said space. Furthermore, since the screw-shaped blade 2 is designed to rotate so that the whole outer edge of the blade and the whole inner edge thereof are always adjacent to the whole inside wall of the drum 1 and the whole outside wall of the inner pipe 3 respectively, and these edges move in a kind of scraping action against the fluid film formed on each of said walls, there is an increase in the coefficient of heat transfer through the boundary film, and a more effective heat exchange can be achieved. Thus, a uniform temperature can be maintained throughout the whole reaction mixture, and therefore the reaction conditions at each point of the apparatus can be kept identical, and an effective reaction can always be expected merely by providing a constant supply of starting material and the required reactant.

The unique advantage provided by the present invention will be by the following example:

EXAMPLE 1

In a process in which nitrogen sesquioxide is introduced a drop at a time into ethyl malonate to obtain ethyl dihydromalonate which is subsequently distilled to ethyl oxomalonate, the results obtained by employing the apparatus illustrated in FIGURE 1 were compared with the results of producing this reaction product in a conventional batch operation. The reactor employed in this example has an inside drum diameter of 20 mm., an outside diameter of the inner pipe of 10 mm. and an effective length of 1500 mm., and the cooling was carried out by introducing coolant into the jacket and the inner pipe. On the other hand, a conventional reactor with stirrer was employed in the batch operation. The yield of ethyl dihydromalonate was 66% when employing the reactor of the present invention whereas a yield of only 52% was achieved by the batch operation. In addition, the yield, after distilling the ethyl dihydromalonate for obtaining ethyl oxomalonate, was 95.3% when the reaction mixture from the reactor of the present invention was used, whereas that using the mixture from the batch reactor was 85.6%. Consequently, an increase in yield of 14% in the oxidizing step, an increase in yield of 9.7% in the subsequent dehydration step and therefore an overall increase in yield of 18.4% was obtained in the oxidation procedure employing the screw reactor built according to the present invention.

The above result establishes that a uniform and complete oxidation was performed by the present apparatus and it is easily appreciated that these advantages are provided by the device of the present invention.

In the embodiment of the apparatus as shown in FIGURE 1, the fluid inside the annular cylindrical space can virtually be moved toward the discharge end thereof in a state closely approximating plug flow as shown in FIGURE 2b, while likewise being rotated in the direction of the circumference of the drum. In many cases, however, the actual flow of the fluid is not so simple as aforementioned. In more detail, although the movement of the portion of the fluid which lies between a pair of adjacent screw blades must be a plug flow as a whole, it may also be considered to have been moved in a lateral direction as well as in a longitudinal direction and to have been stirred by movement of the fluid of another portion having a tendency to spiral flow. This analysis has been confirmed by the calculations derived from various assumptions and by experiments carried out for supporting these calculations. Furthermore, this tendency of the material flow, a more agitated flow, is very significant for efficient heat exchange between the fluid and the heat exchange medium and is considered to be especially preferable in treating a heterogeneous fluid.

However, since this agitating effect is solely due to the movement of the screw blade and the range of the optimal rotational speed of the screw which is capable of producing an ideal plug flow is comparatively narrow and has a small value, it may sometimes be insufficient for a reaction which is extremely exothermic or requires much more intense agitation even if conventional measures are taken, such as providing notches or auxiliary blades on the main blades. Moreover, it is not desirable to intensify the agitating effect by, for example, increasing the rotational speed of the screw because this inevitably changes the flow from the desired plug flow.

The aforementioned disadvantages can be effectively obviated by rotating the inner pipe and/or the inside wall of the drum independently of the rotation of the screw, as is possible in the embodiment of FIGURE 3, and with this improvement in which viscous stirring between the solid phase and the fluid phase is caused by the rotation of either the inner pipe or the drum, the intensity of the reaction can be readily controlled.

The independent rotation of the inner pipe and/or the drum is inevitably accompanied by a detrimental side effect that changes the plug flow from its ideal state to considerable extent, and this tendency cannot be avoided so far as this type of construction is employed. However, since not every reaction requires an ideal plug flow during its performance, the tendency of the apparatus to cause back mixing can sometimes be overlooked in cases where the necessity for particularly intense stirring and/or extremely efficient heat exchange predominate over the necessity for ideal plug flow. Moreover, the optimal rotational speed and direction of the inner pipe or the drum can be chosen for specific operational conditions of a reaction depending on the species and the nature of the reactant employed.

Incidentally, the reactant should be fed into this reactor by, for example, a metering pump and the sucking action of the screw itself should not be utilized because the ideal plug flow cannot be maintained if the propelling action of the screw were also made to serve as a pumping action. Furthermore, if the reactant fluid inside this reactor is not homogeneous and contains a plurality of phases of different densities, it should preferably not be affected by gravity or be accelerated by any other force, and therefore a horizontal positioning of the fluid path is especially preferred.

As shown in FIG. 3, a screw-shaped blade 103 occupies an annular cylindrical space defined by a drum 101, end walls 110 and 111, and an inner pipe 119 mounted rotatably on said end wall 111 and coaxial with said drum 101. Said screw-shaped blade 103 is rotatable on inner pipe 119 and is driven by an end disc 109 which is formed integrally with a power transmitting shaft 118 and a pulley 126 which can be driven by an outside driving mechanism, and the whole outer edge of the blade is adjacent to the inner surface of said drum and the whole inner edge thereof is adjacent to the outside surface of said inner pipe 119. The screw-shaped blade 103 is held in shape by a stacking bar 107 extending through the spires of the blade 103 at several points along the circumference thereof and connecting the blade to said end disc 109. An outside barrel 104 forming a jacket for heat exchange medium together with said drum 101 is mounted on abutment 108 and has an inlet 105 and an outlet 106 therein. One end of said inner pipe 119 has a projection 116 thereon on which is rotatably mounted the power transmitting shaft 118, and the other end has a pulley 121 which is designed to be driven by an outside driving mechanism and is supported on a fluid tight bearing 120 which is formed integrally with said end wall 111. Said end wall 111 has an outlet 115 therein for reactant and is mounted on an abutment 125 together with said bearing 120. Inside said pulley 121, there is provided an end disc 122 relative to which said pulley 121 is rotatable and which has therein an inlet 123 and an outlet 124 for heat exchange medium.

The other end wall 110 is mounted on an abutment 125 by means of an integrally formed fluid-tight bearing 117 and has a couple of inlets 112 and 113 for reactant and rotatably supports said drum 101. Said drum 101 is also rotatably mounted on the other end wall 111 and is rotatable between the outer barrel 104 and the two end walls 110 and 111 and has a pulley 102 which can be driven by an outside driving means. As clearly seen from FIGURE 3, said outside barrel 104 and both end walls 110 and 111 are stationary, and they and said drum 101 should be maintained in strict fluid-tight relationship.

In the operation of the apparatus, one of the reactants, for example a starting material, is continuously supplied through the inlet 112 and the other reactant required for effecting a progressive reaction on the starting material is supplied through the inlet 113. These materials are combined at the confluence of the two inlets 112 and 113 to initiate the required reaction. The reaction mixture in which the reaction has already been initiated travels towards the left end of the apparatus as shown in the drawing by the action of the screw-shaped blade 103 which is rotated in its propelling direction by the shaft 118. In this manner, the fluid inside the annular cylindrical space is uniformly moved toward the discharge end thereof in a state closely approximating plug flow, as shown in FIGURE 2B, while also being rotated in the direction of the circumference of the drum.

In addition to the above, when either the drum or the inner pipe, or the both of them are rotated independently of the rotation of the screw, viscous stirring between the solid phase and the fluid phase takes place and the stirring further causes an intense turbulent flow inside the fluid.

EXAMPLE II

In a process in which 5-methyl-acetosulfanylamide isoxazol is hydrolyzed by sodium hydroxide in an agueous solution, the results obtained by employing the apparatus illustrated in FIGURE 3 were compared with the results of producing this reaction product in a conventional batch operation.

The reactor employed in this example had an outside diameter of the inner pipe 119 of 30 mm., an inside diameter of the drum 101 of 80 mm., an outside diameter of the outside barrel of 130 mm., and an effective length of 800 mm., and was heated by means of steam passing through the space formed between the drum 101 and the outside barrel 104. On the other hand, a conventional reactor with stirrer was employed in the batch operation.

Although an increase in the yield of only 1% was obtained in this particular example, the time required for the operation was only 10 minutes whereas about 1 hour was required for the same reaction in the conventional batch operation. In addition to this, a higher quality and more stable product was obtained in this example together with the reduction in the optional time and a low dispersion in grade. This demonstrates the superiority of this apparatus over a conventional batch apparatus.

Although heating by a heat exchange medium is employed in this example, a coolant can also be circulated through the jacket for cooling the reactant in an exothermic reaction.

It is thought that the invention and its advantages will be understood from the foregoing description and it is apparent that various changes may be made in the form, construction and arrangements of the parts without departing from the spirit and scope of the invention or sacrificing its material advantages, the forms hereinbefore described and illustrated in the drawings being merely preferred embodiments thereof.

We claim:

1. A heat exchange screw reactor comprising a drum member having at least one inlet opening therein and at least one outlet opening for discharging material therefrom, a jacket for heat exchange medium fixedly mounted around said drum member and substantially surrounding the outside of the peripheral wall thereof, an inner pipe member fixedly mounted within said drum member and substantially coaxial therewith, said inner pipe member having means therein for circulation of a heat exchange medium therethrough, said drum member and said inner pipe member defining between them an annular cylindrical fluid-tight space, a screw member inside said annular cylindrical fluid-tight space and rotatable around said inner pipe, the outer edge of said screw member being adjacent to the inside of the wall of said drum and the inside edge of the screw member being adjacent to the outside surface of said inner pipe and means coupled to said screw member for rotating said member in a direction for conveying materials to be treated in the direction from the inlet to the outlet of said drum member.

2. A heat exchange screw reactor as claimed in claim 1 in which there are a plurality of inlets in said drum member.

3. A heat exchange screw reactor as claimed in claim 1 in which said inlet opening is on one end of said drum member and said outlet opening is on the other end thereof.

4. A heat exchange screw reactor as claimed in claim 1 in which said screw member has reinforcing rods extending between the spires thereof for holding said screw member in shape.

5. A heat exchange screw reactor as claimed in claim 1 in which said inner pipe member has an inlet pipe which extends deep into said inner pipe member.

6. A heat exchange screw reactor comprising a drum member having at least one inlet opening therein and at least one outlet opening for discharging material therefrom, a jacket for heat exchange medium mounted around said drum member and substantially surrounding the outside of the peripheral wall thereof, said drum member being rotatable within said jacket, an inner pipe member rotatably mounted within said drum member and substantially coaxial therewith, said inner pipe member having means therein for circulation of a heat exchange medium therethrough, said drum member and said inner pipe member defining between them an annular cylindrical fluid-tight space, a screw member inside said annular cylindrical fluid-tight space and rotatable relative to said drum member and said inner pipe member, the outer edge of said screw member being adjacent to the inside of the wall of said drum and the inside edge of the screw member being adjacent to the outside surface of said inner pipe and means coupled to said screw member for rotating said screw member and, coupled at least to one of said remaining members for rotating said remaining member independently of the screw member and the other remaining member.

7. A heat exchange screw reactor as claimed in claim 6 in which said screw rotating means rotates said screw member in a direction for conveying materials to be treated in the direction from the inlet to the outlet of said drum member.

8. A heat exchange screw reactor as claimed in claim 6 in which there are a plurality of inlets in said drum member.

9. A heat exchange screw reactor as claimed in claim 6 in which said inlet opening is on one end of said drum member and said outlet opening is on the other end thereof.

10. A heat exchange screw reactor as claimed in claim 6 in which said screw member has reinforcing rods extending between the spires thereof for holding said screw member in shape.

11. A heat exchange screw reactor as claimed in claim 6 in which said inner pipe member has an inlet pipe which extends deep into said inner pipe member.

12. A heat exchange screw reactor as claimed in claim 6 in which said rotating means is coupled to both the drum member and the inner pipe member for rotating them independently of each other and the screw member.

References Cited

UNITED STATES PATENTS

| | | | |
|---|---|---|---|
| 1,949,374 | 2/1934 | Johnson | 165—94 XR |
| 2,530,409 | 11/1950 | Stober et al. | 23—285 XR |
| 3,206,287 | 9/1965 | Crawford | 23—285 |

JAMES H. TAYMAN, Jr., Primary Examiner

U.S. Cl. X.R.

23—252, 290; 165—86, 88, 89, 91, 94